(12) United States Patent
Park et al.

(10) Patent No.: US 11,752,492 B2
(45) Date of Patent: Sep. 12, 2023

(54) DENITRIFICATION-OXIDATION COMPLEX CATALYST STRUCTURE AND MANUFACTURING METHOD THEREOF

(71) Applicant: NANO co., ltd, Sangju-si (KR)

(72) Inventors: Paul Worn Park, Gimcheon-si (KR); Dong-Woo Shin, Sangju-si (KR); Bekelcha Tesfaye, Gimcheon-si (KR)

(73) Assignee: NANO CO., LTD, Sangju-si (KR)

( * ) Notice: Subject to any disclaimer, the term of this patent is extended or adjusted under 35 U.S.C. 154(b) by 0 days.

(21) Appl. No.: 17/748,665

(22) Filed: May 19, 2022

(65) Prior Publication Data

US 2023/0173465 A1 Jun. 8, 2023

(30) Foreign Application Priority Data

Dec. 2, 2021 (KR) .................. 10-2021-0171305
Apr. 5, 2022 (KR) .................. 10-2022-0041973

(51) Int. Cl.
*B01J 23/652* (2006.01)
*B01J 21/06* (2006.01)
*B01J 21/16* (2006.01)
*B01J 35/04* (2006.01)
*B01J 37/00* (2006.01)
*B01J 37/02* (2006.01)
*B01J 37/08* (2006.01)
*B01D 53/94* (2006.01)
*F01N 3/20* (2006.01)
*F01N 3/28* (2006.01)

(52) U.S. Cl.
CPC ........ *B01J 23/6527* (2013.01); *B01D 53/944* (2013.01); *B01D 53/9418* (2013.01); *B01D 53/9436* (2013.01); *B01D 53/9472* (2013.01); *B01J 21/063* (2013.01); *B01J 21/16* (2013.01); *B01J 35/04* (2013.01); *B01J 37/0018* (2013.01); *B01J 37/0217* (2013.01); *B01J 37/0236* (2013.01); *B01J 37/08* (2013.01); *B01D 2255/1021* (2013.01); *B01D 2255/20723* (2013.01); *B01D 2255/20776* (2013.01); *B01D 2255/9155* (2013.01); *B01D 2255/9202* (2013.01); *F01N 3/2066* (2013.01); *F01N 3/2803* (2013.01); *F01N 3/2842* (2013.01); *F01N 2330/32* (2013.01); *F01N 2370/02* (2013.01)

(58) Field of Classification Search
CPC ........ B01J 23/6527; B01J 21/16; B01J 35/04; B01J 37/0018; B01J 37/08; B01J 37/0217; B01J 37/0236; B01J 21/063; B01D 53/9472; B01D 53/9436; B01D 53/9418; B01D 53/944; B01D 2255/20723; B01D 2255/20776; B01D 2255/1021; B01D 2255/9155; B01D 2255/9202; F01N 2330/32; F01N 3/2803; F01N 3/2066; F01N 3/2842; F01N 2370/02

See application file for complete search history.

(56) References Cited

U.S. PATENT DOCUMENTS

| | | | |
|---|---|---|---|
| 2011/0271664 A1* | 11/2011 | Boorse | B01J 37/024 422/171 |
| 2014/0154163 A1* | 6/2014 | Andersen | B01J 35/0006 422/171 |
| 2016/0367974 A1* | 12/2016 | Larsson | B01J 29/743 |
| 2018/0280876 A1* | 10/2018 | Chen | F01N 3/208 |
| 2018/0280877 A1* | 10/2018 | Chen | B01J 23/30 |
| 2022/0203338 A1* | 6/2022 | Hilgendorff | B01J 37/0009 |
| 2022/0203345 A1* | 6/2022 | Yamashita | B01D 53/9418 |

FOREIGN PATENT DOCUMENTS

| | | | | |
|---|---|---|---|---|
| KR | 101634390 B1 | 6/2016 | | |
| KR | 20170041900 A | 4/2017 | | |
| KR | 20180034398 A | 4/2018 | | |
| KR | 20210035228 A | 3/2021 | | |
| WO | WO 2020 226 127 A1 * | 11/2020 | | B01J 37/088 |

\* cited by examiner

*Primary Examiner* — Timothy C Vanoy
(74) *Attorney, Agent, or Firm* — STIP Law Group, LLC

(57) ABSTRACT

Proposed inventions are a recipe of denitrification-oxidation complex catalyst containing an SCR catalyst and an oxidation catalyst to simultaneously remove nitrogen oxides, carbon monoxide, hydrocarbons, and ammonia, a manufacturing method thereof, an exhaust gas treatment method using the denitrification-oxidation complex catalyst, and an SCR denitrification system including the denitrification-oxidation complex catalyst. The denitrification-oxidation complex catalyst simultaneously removes nitrogen oxides, carbon monoxide, hydrocarbons, and ammonia and exhibits an increased catalytic effect compared to the cases where the denitrification catalyst used alone and the denitrification and the oxidation catalyst ratios are and not properly balanced. When the denitrification-oxidation complex catalyst is applied to an SCR denitrification system, the structure is simplified, space is saved, cost is reduced, and catalyst maintenance is easy.

12 Claims, 5 Drawing Sheets

DENITRIFICATION-OXIDATION COMPLEX CATALYST STRUCTURE AND MANUFACTURING METHOD THEREOF

CROSS REFERENCE TO RELATED APPLICATION

The present application claims priority to Korean Patent Application No. 10-2022-0041973 filed on Apr. 5, 2022, and No. 10-2021-0171305 filed on Dec. 2, 2021, the entire contents of which is incorporated herein for all purposes by this reference.

BACKGROUND OF THE INVENTION

1. Field of the Invention

The present disclosure relates to a denitrification-oxidation complex catalyst structure, including a denitrification catalyst and an oxidation catalyst, and a method for manufacturing the same. More particularly, the present disclosure relates to a complex catalyst structure in which nitrogen oxides, carbon monoxide, hydrocarbons, and unreacted ammonia are removed by sequentially performing selective catalytic reduction and oxidation reactions by introducing exhaust gas emitted from an internal combustion engine or a power plant.

2. Description of the Related Art

Selective catalytic reduction reaction (SCR) is an emission control method that converts harmful nitrogen oxides ($NO_x$) into harmless nitrogen gas ($N_2$) using a reducing agent ($NH_3$, $CO(NH_2)_2$, etc.) and a catalyst. It is applicable to both stationary (e.g., power plants) and mobile (e.g., vehicle engines) emission sources with $NO_x$ removal efficiencies of up to 95% or more.

$NH_3$—SCR using ammonia as a reducing agent is the most representative and widely applied in industry, and the $NH_3$—SCR system is basically composed of a reactor with a denitrification catalyst, a reducing agent tank for $NH_3$ storage, and an injection system. Before entering the reactor, the reducing agent is properly mixed with the exhaust gas, and in the denitrification catalyst reactor, $NO_x$ from the exhaust gas and injected $NH_3$ selectively react when passing through the catalyst to generate nitrogen gas ($N_2$) and water. Despite such a system, there may be a small amount of $NH_3$ in an unreacted state called ammonia slip, and some residual ammonia (ammonia slip) causes contamination of downstream devices or byproducts or emission of ammonia to the atmosphere.

In general, high ammonia slip is considered an important indicator of SCR system because it is harmful to health, and since the emission of ammonia as well as $NO_x$ is strictly regulated in many countries, the development of a catalyst or device capable of converting excess ammonia into nitrogen in an oxygen atmosphere without generating $NO_x$ is acutely required. Furthermore, a safe and efficient method of minimizing ammonia slip in downstream of an SCR catalyst and lowering the content of carbon monoxide and hydrocarbons in the emitted exhaust gas is also required.

On the other hand, a catalyst, catalyst system, and method for removing ammonia and/or carbon monoxide from combustion gas using a selective catalytic reduction reaction (SCR) catalyst for reducing nitrogen oxides and ammonia are described in Korea Patent Publication No. 10-1634390 (announcement date 2016 Jun. 22). Here, the double oxidation catalyst generally includes an alkali component, a transition metal, and a metal oxide support, and the double oxidation catalyst has little precious metal component and is effective in oxidizing ammonia ($NH_3$) and carbon monoxide (CO) at the same time when disposed of in an exhaust gas stream.

In addition, Korea Patent Application Laid-open Publication No. 10-2018-0034398 (published date of 2018 Apr. 4) discloses a catalyst article having a first zone containing a first SCR catalyst and a second zone containing ammonia slip catalyst (ASC). Here, the ammonia slip catalyst contains a second SCR catalyst and an oxidation catalyst, the ASC has a diesel oxidation catalyst (DOC) functionality, the first zone is located at the inlet side of the substrate, and the second zone is located at the outlet side of the substrate. The catalyst article is useful for reducing the amount of ammonia slip and oxidizing organic residues in the selective catalytic reduction (SCR) of $NO_x$ in the exhaust gas.

Although the related literature discloses that the denitrification reaction occurs by selective catalytic reduction and that the amount of ammonia slip is reduced by the oxidation catalyst at the rear stage. Still, the ammonia slip may not be completely removed, and unreacted ammonia may be converted into $NO_x$ again due to an excessive oxidation reaction.

DESCRIPTION OF THE RELATED ART

Patent Literatures (Patent literature 1) Korea Patent Publication No. 10-1634390 (announcement date: 2016 Jun. 22)
(Patent literature 2) Korea Patent Application Laid-open Publication No. 10-2018-0034398 (published date: 2018 Apr. 4)

SUMMARY OF THE DISCLOSURE

The main objective of the present disclosure is to solve the above problems. The present disclosure is to provide a denitrification-oxidation complex catalyst in which $NO_x$, CO, hydrocarbon, and $NH_3$ in a combustion gas are simultaneously removed by including an SCR reaction region at the front end and an oxidation reaction region at the rear end thereof.

Another objective of the present disclosure is to provide a manufacturing method for denitrification-oxidation complex catalyst in which an SCR catalyst and an oxidation catalyst are included to remove $NO_x$, CO, hydrocarbon, and $NH_3$ simultaneously.

The other object of the present invention is to provide an exhaust gas treatment method using a denitrification-oxidation complex catalyst, and an SCR denitrification system for simultaneously removing $NO_x$, CO, hydrocarbon, and $NH_3$ by including an SCR catalyst and an oxidation catalyst.

In order to achieve the above objectives, an embodiment of the present disclosure provides a denitrification-oxidation complex catalyst structure that includes a monolith-type catalyst structure with a plurality of cells comprising a selective catalytic reduction catalyst and a support; and an oxidation catalyst coated on the surface of each cell of the catalyst structure by a predetermined length toward an inlet of the catalyst structure from an outlet of the catalyst structure, wherein the catalyst structure removes nitrogen oxides, carbon monoxide, hydrocarbons, and ammonia at the same time.

In a preferred embodiment of the present disclosure, the selective reduction catalyst may include 0.5% to 7% by weight of vanadium and 2% to 8% by weight of tungsten.

In addition, the oxidation catalyst may include 0.1% to 3% by weight of platinum, 1% to 4% by weight of vanadium, and 1% to 8% by weight of tungsten.

In a preferred embodiment of the present disclosure, the catalyst structure may have any one type among a plate type, a layered type, a corrugated type, and a honeycomb type.

In a preferred embodiment of the present disclosure, the ratio of the length of the denitrification region uncoated with the oxidation catalyst 200 to the length of the oxidation region coated with the oxidation catalyst 300 in the entire length of the catalyst structure may be greater than 2 and less than or equal to 7.

In a preferred embodiment of the present disclosure, the thickness in which the oxidation catalyst is coated on the cell in the oxidation region may be 10 to 200 μm with respect to the cell of the catalyst structure.

In a preferred embodiment of the present disclosure, the support may be 50% to 90% by weight of $TiO_2$.

Another embodiment of the present disclosure provides a manufacturing method for denitrification-oxidation complex catalyst structure, the method includes: (a) preparing a raw material composition including a selective catalytic reduction catalyst, a support, and a binder; (b) manufacturing a catalyst structure including a plurality of cells by manufacturing the raw material in a monolith form and then drying and calcinating the same; (c) coating an oxidation catalyst on a plurality of cell surfaces of the catalyst structure with a predetermined length in an inlet direction from an outlet of the catalyst structure.

In addition, the selective reduction catalyst may include 0.5% to 7% by weight of vanadium and 2% to 8% by weight of tungsten, and the oxidation catalyst may include 0.1% to 3% by weight of platinum, 1% to 4% by weight of vanadium, and 1% to 8% by weight of tungsten.

On the other hand, the calcination in step (b) may be performed at 500° C. to 625° C. In a preferred embodiment of the present disclosure, the coating of the oxidation catalyst in step (c) may include retaining one end of the catalyst structure prepared in step (b) in a slurry containing an oxidation catalyst component and drying and calcinating after removing the catalyst structure from the slurry containing the oxidation catalyst component and blowing an excess of the slurry with compressed air after retaining for a predetermined time.

In addition, the calcinating in step (c) may be performed at 450° C. to 550° C.

Another embodiment of the present disclosure provides an exhaust gas treatment method using the catalyst structure for denitrification-oxidation.

In the monolith-type denitrification-oxidation complex catalyst structure, according to the present disclosure, the catalyst for denitrification reaction is located on the inlet side, and the catalyst for oxidation reaction is coated on the outlet side. Since there is a region in which oxidation reaction occurs, unreacted ammonia in the denitrification reaction region is converted into nitrogen and water, and carbon monoxide and hydrocarbons contained in the exhaust gas are oxidized so that $NO_x$, CO, hydrocarbon, and $NH_3$ can be simultaneously removed from the introduced exhaust gas. Compared to a system in which the denitrification catalyst reaction unit and the oxidation catalyst reaction unit are separated, the less pressure loss not only improves energy efficiency but also intensively reduces the required space and has the effect of reducing costs when manufacturing and installing catalysts.

DESCRIPTION OF THE PREFERRED EMBODIMENTS

Unless defined otherwise, all technical and scientific terms used herein have the same meaning as commonly understood by one ordinary skilled in the art to which this disclosure belongs. In general, the nomenclature used herein is well-known and commonly used in the art.

When a part of the present specification "include" a component throughout the present specification, this means that it may further include other components rather than excluding the other component unless otherwise opposed.

As used herein, terms such as "include", "equip", or "have" refer to the presence of, and refer to, a feature, number, step, operation, component, part, or a combination thereof described in the specification. It does not exclude the possibility that other features, figures, steps, operations, components, parts, or combinations thereof may exist or may be added unless otherwise noted.

Throughout this specification, "reaction part" and "reaction region" mean the space in the reactor where the reactants react, and "internal" and "inside" are the radial center of a circle that is a cross section of the reactor perpendicular to the direction of gravity. direction, and "outside" or "outer side" means facing in the radial, circumferential direction of a circle that is a cross-section cut perpendicular to the direction of gravity of the reactor.

In one aspect, the present disclosure relates to a denitrification-oxidation complex catalyst structure, in which the catalyst structure includes a monolith-type SCR catalyst including a plurality of cells 100 in various forms and a support, and an oxidation catalyst coated on the surface of a plurality of cells of the catalyst structure by a predetermined length in the direction from the outlet to the inlet of the catalyst structure. The present disclosure relates to a denitrification-oxidation complex catalyst structure in which nitrogen oxides, carbon monoxide, hydrocarbons, and ammonia are simultaneously removed from gases emitted from power plants and LNG ships.

Hereinafter, the present disclosure will be described in detail with reference to the accompanying drawings.

Figure 1:
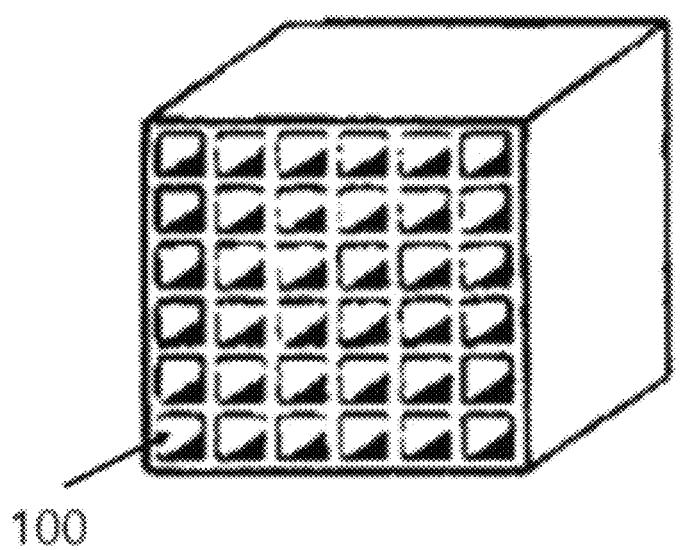
FIG. 1(a) and FIG. 1(b) are a monolith-type catalyst structure according to an embodiment of the present disclosure.
Figure 1B:
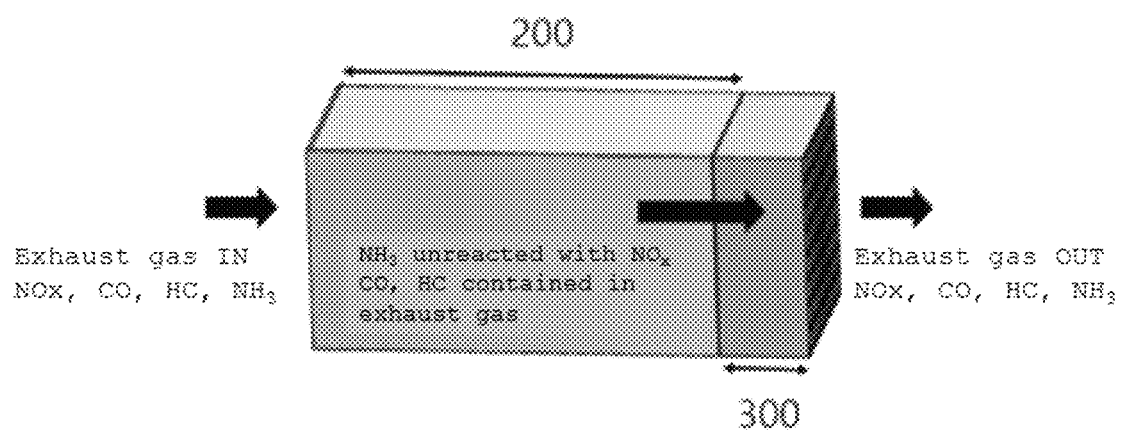

FIG. 1 is a monolith-type catalyst structure according to an embodiment of the present disclosure. In this monolith-type catalyst structure, a plurality of cells 100 is formed with a partition wall therebetween. In general, the reactant is introduced to the inlet side, and a reaction occurs as the reactant passes through each cell.

The catalyst structure, according to the present disclosure, is manufactured as a monolith-type structure with cells by introducing a raw material, including an SCR catalyst and a support, into an extruder, and the oxidation reaction catalyst is coated on the surface of the manufactured structure by a predetermined length on the outlet side of the prepared structure. Here, the region in which the oxidation reaction catalyst of the monolith-type catalyst structure is coated is referred to as an oxidation region, and a region excluding the oxidation region of the catalyst structure, that is, a region where denitrification reaction occurs, is referred to as a denitrification region.

Exhaust gas discharged from a power plant or LNG ship is introduced into the catalyst structure and passes through the denitrification region to convert $NO_x$ into nitrogen and water by the selective catalytic reduction reaction (SCR) of Formula 1.

$$NO_x + NH_3 + O_2 \rightarrow N_2 + H_2O \quad \text{[Formula 1]}$$

After passing through the denitrification region, ammonia that has not reacted with $NO_x$, carbon monoxide, and hydrocarbons is converted to carbon dioxide, nitrogen, and water in the oxidation region by the following Formula 2.

$$CO + O_2 \rightarrow CO_2$$

$$Hydrocarbon + O_2 \rightarrow CO_2 + H_2O$$

$$NH_3 + O_2 \rightarrow N_2 + H_2O \quad \text{[Formula 2]}$$

In general, selective catalytic reduction catalysts in the denitrification region include metal oxide-based, zeolite-based, transition-metal-oxide-based, rare-earth-based catalysts, and the present disclosure may include vanadium, molybdenum, tungsten as selective catalytic reduction catalysts, and 0.5% to 7% by weight of vanadium and 2% to 8% by weight of tungsten-based on the weight of the denitrification region structure may be included.

Here, when the amount of vanadium is less than 1% by weight, the denitrification performance at low temperature has deteriorated, and when the amount of vanadium is more than 5% by weight, a problem occurs in that ammonia is oxidized at a high temperatures before the denitrification reaction. In addition, when the amount of tungsten is also less than 2% by weight, durability at high temperature is reduced, and when the amount of tungsten is more than 8% by weight, a problem occurs in that the catalyst unit cost is increased more than necessary.

In addition, $TiO_2$ may be used as the support but is not limited thereto. The support may be included in an amount of 50% to 90% by weight.

The catalyst for the oxidation reaction in the oxidation region may include 0.1% to 3% by weight of platinum, 1% to 4% by weight of vanadium, and 1% to 8% by weight of tungsten.

When the amount of platinum is less than 0.1% by weight, oxidation activity is not sufficient, and when the amount of platinum is more than 1% by weight, a problem occurs in that $NH_3$ is oxidized to $NO_x$. In addition, when the amount of vanadium is less than 1% by weight, it is not possible to effectively control the oxidation power of platinum, and when the amount of vanadium is more than 4% by weight, the conversion rate of ammonia and carbon monoxide at low-temperature decreases, and a problem of oxidizing $NH_3$ at high temperature occurs, and when the amount of tungsten is less than 1% by weight or more than 8% by weight, the nitrogen selectivity has deteriorated, and when further more than 8% by weight is included, a problem occurs in that the catalyst unit price is increased more than necessary.

On the other hand, the catalyst structure may have a monolith-type, and specifically, may be a honeycomb type, a plate type, a layered type, a corrugated type, or the like, but is not limited thereto.

The length ratio of the oxidation region and the denitrification region of the catalyst structure plays an important role in simultaneously removing nitrogen oxides, carbon monoxide, hydrocarbons, and ammonia from the introduced gas. In the total length of the catalyst structure, the ratio of the length of the denitrification region uncoated with the oxidation catalyst 200 to the length of the oxidation region coated with the oxidation catalyst 300 (the length of the denitrification region/the length of the oxidation region) is greater than 2 and less than or equal to 7, preferably is 3 to 5.

When the ratio of the length of the denitrification region 200 to the length of the oxidation region 300 is 2 or less or is greater than 7, nitrogen oxides, carbon monoxide, hydrocarbons, and ammonia may not be effectively removed at the same time because both denitrification and oxidation reactions are not properly balanced.

That is, when the ratio of the length of the denitrification region 200 to the length of the oxidation region 300 is greater than 7, the conversion rate of carbon monoxide is insufficiently low, and the ammonia slip through which the excess unreacted ammonia flows out occurs more. In addition, when the ratio (the denitrification region length/the oxidation region length) is 2 or less, the denitrification reaction is insufficient, and the oxidation reaction excessively occurred, and ammonia is called back into nitrogen oxide, thereby significantly lowering the denitrification effect.

In the present disclosure, the oxidation catalyst of the oxidation region is coated by wash coating, and the thickness of the coating film is preferably 10 to 200 μm. When the coating thickness is less than 10 μm, the oxidation reaction is not sufficient, and when the coating thickness is larger than 200 μm, a problem occurs in that the differential pressure is large. More preferably, the thickness of the coating film is 10 to 100 μm.

Another embodiment of the present disclosure provides the method for preparing a denitrification-oxidized complex catalyst structure, the method includes: (a) preparing a raw material composition including a selective catalytic reduction catalyst, a support, and a binder; (b) manufacturing a catalyst structure including a plurality of cells by manufacturing the raw material in a monolith form and then drying and calcinating the same; (c) coating an oxidation catalyst on a plurality of cell surfaces of the catalyst structure with a predetermined length in an inlet direction from an outlet of the catalyst structure.

Regarding the method to prepare the catalyst structure, step (a) is to prepare a raw material composition, and catalytically active material is introduced for SCR catalytic activity of the catalyst structure but is not particularly limited, but the present disclosure may mix and use components such as a tungsten precursor, a vanadium precursor, and titanium oxides be mixed and used. In the raw material composition, 0.5% to 7% by weight of vanadium and 2% to 8% by weight of tungsten may be included. Within the above range, it is possible to further promote catalytic activity by adding necessary additives during the preparation of the selective catalytic reduction catalyst structure, and at the same time, to improve mechanical properties, abrasion resistance, and strength.

In the step of preparing the support included in the raw material composition, a composition to prepare a support including a raw metatitanic acid and a silicon dioxide compound may be added, and the support may be prepared by heat-treatment of the composition to prepare a support.

Preparing the raw material composition includes additionally mixing one or more of a catalytic active material, an organic binder, and an inorganic binder with the support and kneading them. The kneading method of the raw material composition is not particularly limited, and a general method for preparing the raw material composition may be employed.

In one embodiment, the raw material composition may include all support particles, a catalytic active material, an organic binder, and an inorganic binder. In this case, the elongation and yield stress of the raw material composition is improved, and the moisture content and plasticity are adjusted to an appropriate range so that extrusion moldability can be further improved.

Preparing the kneaded raw material composition may include adjusting the moisture content to 25% to 40% and plasticity to 30% to 50% of the raw material composition. In this case, the yield stress, bonding strength, and plasticity of the raw material composition are further improved, thereby further improving extrusion moldability and shape retention in the preparation of a catalyst structure for a selective catalytic reduction catalyst.

Preparing the catalyst structure includes introducing the raw material composition into an extruder, extruding it in a monolith type, drying and calcinating to manufacture a catalyst structure for a selective catalytic reduction catalyst.

The extrusion may be performed in a vacuum extrusion method at room temperature but is not limited thereto. In this case, the abrasion resistance and strength of the catalyst structure for the selective catalytic reduction catalyst may be further improved.

The drying may be performed, for example, at 30° C. to 70° C. for 6 to 18 hours. In this case, the occurrence of dry cracks in the catalyst structure for the selective catalytic reduction catalyst may be prevented, and wear resistance and strength may be further improved.

The calcinating may be performed, for example, in a hot air method in a continuous kiln at 500° C. to 625° C. for 6 to 8 hours. In this case, the abrasion resistance and strength of the catalyst structure for the selective catalytic reduction catalyst may be further improved.

As the binder, an organic binder and/or an inorganic binder may be used, and the organic binder combines components in the raw material composition, improves compatibility, and physically and chemically reinforces a shape when manufacturing a catalyst structure for a selective catalyst reduction catalyst.

The content of the organic binder in the kneaded raw material composition may be 1% to 5% by weight. Within the above range, when manufacturing a honeycomb structure for a selective catalyst reduction catalyst, extrusion formability may be further improved while mechanical properties, wear resistance, and strength may be improved at the same time.

In addition, the inorganic binder combines the components in the raw material composition, improves compatibility, and physically and chemically reinforces the shape when manufacturing a catalyst structure for a selective catalyst reduction catalyst.

The inorganic binder may be, for example, at least one of alumina, glass, water glass, and glass fiber. The inorganic binder of the example may be used alone or in a combination of two or more. The glass fibers are re-agglomerated after being dispersed in the raw material composition, thereby further improves extrusion moldability when preparing a catalyst structure for a selective catalytic reduction catalyst and at the same time, further improves abrasion resistance and strength.

Hereinafter, the present disclosure will be described in more detail with reference to a specific example. The following examples are merely illustrative to help the understanding of the present disclosure, and the scope of the present disclosure is not limited thereto.

Preparation Example: Preparation of Catalyst Structure 10 to 100 kg of catalyst active materials ($WO_3$, $V_2O_5$) and 10 to 50 kg of organic binders; 10 to 100 kg of inorganic binders (clay and glass fibers) were added to 500 kg of the titanium support and then mixed at 25° C. to 80° C. for 1 to 10 hours using a kneader-mixer device.

A catalyst structure specimen in the form of a honeycomb having an external size of 42 mm×42 mm×100 mm (width× height×length, thickness 0.6 mm) was prepared by using a 1″ molding extruder using the kneaded original composition as described above under constant speed conditions.

The prepared catalyst structure was dried at 50° C. for 10 hours, and after calcinating was performed at 600° C. for 8 hours, the length of the desired oxidation region was washcoated with an oxidation catalyst slurry containing platinum.

The oxidation catalyst slurry is composed of 10% to 50% by weight (or 15% to 30% by weight) of a catalyst material pre-prepared with $Pt/V/W/TiO_2$ by coprecipitation, 1% to 5% by weight (or 1% to 3% by weight) of an inorganic additive, 0% to 5% by weight (or 0% to 1% by weight) of an organic additive, and the remainder of an organic or water-soluble solvent (40 to 89% by weight).

Washcoating is performed after the catalyst structure is standing in the oxidation catalyst slurry for a certain period of time, the catalyst structure is separated from the slurry, the excess slurry is blown out with compressed air, and then dried for a predetermined time. Washcoating may be repeated several times to achieve the desired thickness of the coating. After the final drying, calcinating is performed. Drying temperature is 80° C. to 150° C. for 1 to 3 hours, and calcinating temperature is 450° C. to 550° C. for 3 to 10 hours.

The catalyst structures of Examples and Comparative Examples are prepared by the above-described methods, and in each of Examples and Comparative Examples, a composition ratio of an SCR catalyst and an oxidation catalyst, a length ratio of a denitrification region, and a coating thickness are differently changed.

The conditions of Examples and Comparative Examples are shown in [Table 1] below.

TABLE 1

| | SCR catalyst (% by weight) | | Oxidation catalyst (% by weight) | | | Denitrification region length/ oxidation region length | Oxidation catalyst coating thickness (μm) |
|---|---|---|---|---|---|---|---|
| | V | W | Pt | V | W | | |
| <Example 2> | 2. | 3. | 0.3 | 2. | 3. | 3. | 100. |
| <Comparative Example 1> | 2. | 3. | 0. | 0. | 0. | — | 0. |

[Experimental Example 1]: Exhaust Gas Denitrification and Oxidation Reaction Performance Test (Complex Catalyst Structure Effect)

Exhaust gas introduced into the catalyst structure in Example 2 and Comparative Example 1 was composed of 500 ppm of carbon monoxide, 360 ppm of ammonia, 300 ppm of NO, 25 ppm of $SO_2$, 5% of oxygen, 5% of $H_2O/N_2$ balance, and the space velocity of the denitrification region in the catalyst structure is 33,000 $h^{-1}$ and 100,000 $h^{-1}$ in the oxidation region.

Under these conditions, the concentrations of carbon monoxide, ammonia, NO, $NO_2$, and $N_2O$ were measured while changing the temperature of the reactor from 208° C. to 500° C.

Figure 2A:
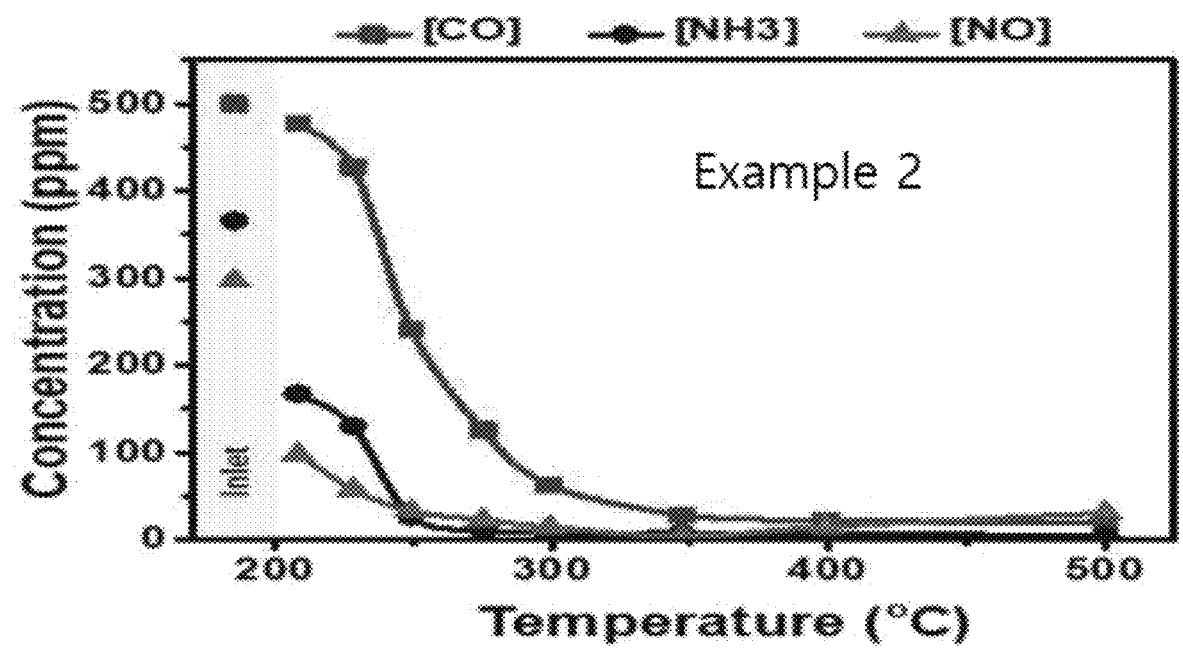
FIG. 2(a) and FIG. 2(b) are a change in the concentration of carbon monoxide, ammonia, and NO according to an embodiment and a comparative example of the present disclosure for each reaction temperature.
Figure 2B:
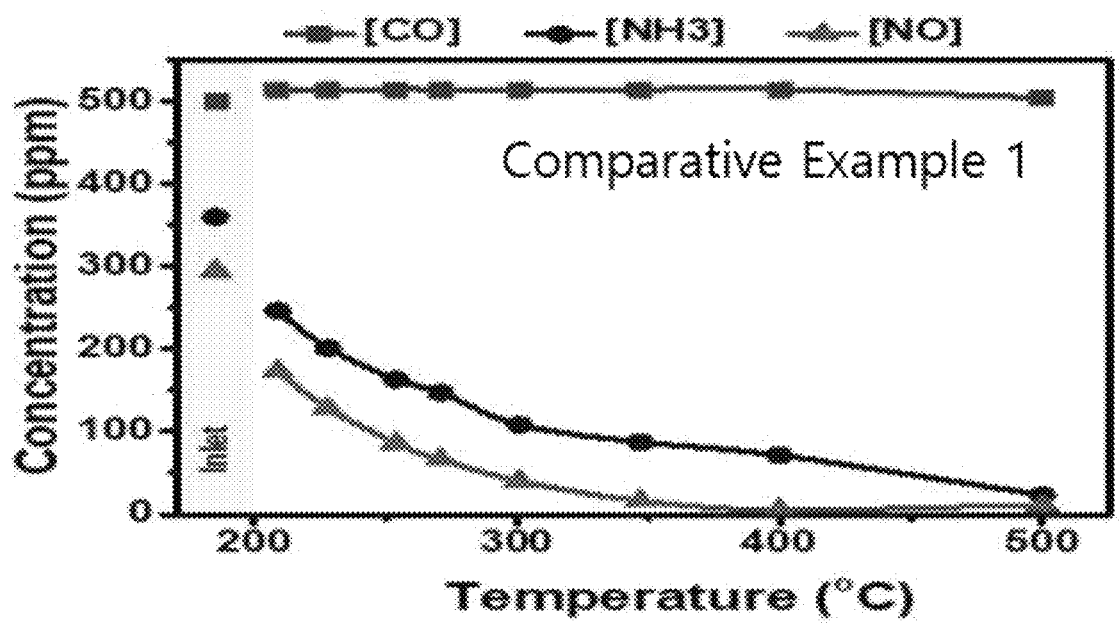

FIG. 2 shows the concentrations of carbon monoxide, ammonia, and NO at each reaction temperature. In Comparative Example 1, the concentration of carbon monoxide was continuously maintained regardless of the temperature at the time of introduction, and significant amounts of ammonia and NO were still discharged when operated at 400° C. or less. On the other hand, in the complex catalyst structure in which the denitrification catalyst and the oxidation catalyst are present together (Example 2), carbon monoxide is discharged at a concentration significantly lower than the concentration initially introduced, and ammonia and NO are hardly discharged at 300° C.

[Experimental Example 2]: Experiments on the Performance of Denitrification and Oxidation Reaction of Exhaust Gases (Effects of SCR Region to Oxidation Region Length Ratio)

TABLE 2

|  | Denitrification Area length | Oxidation Area length | Denitrification region length/oxidation region length |
|---|---|---|---|
| <Example 1> | 10.0. | 2.0. | 5.00. |
| <Example 2> | 9.0. | 3.0. | 3.00. |
| <Example 3> | 8.5. | 3.5. | 2.43. |
| <Comparative Example 2> | 11.0. | 1.0. | 11.00. |
| <Comparative Example 3> | 8.0. | 4.0. | 2.00. |
| <Comparative Example 4> | 7.0. | 5.0. | 1.40. |

Table 2 shows the ratio of the length of the denitrification reaction regions of Embodiments 1 to 3 and Comparative Examples 2 to 4 to the length of the oxidation reaction region, and the ratio was changed to 1.4 to 11.0. These catalyst composition ratios have the same composition ratios as those of the catalyst of Example 2, as shown in Table 1.

Concentrations of carbon monoxide, ammonia, NO, $NO_2$, and $N_2O$ were measured while changing the temperature of the reactor from 300° C. to 500° C. under the same conditions in which the exhaust gas introduced into the catalyst structure was introduced as in Example 2.

Figure 3:
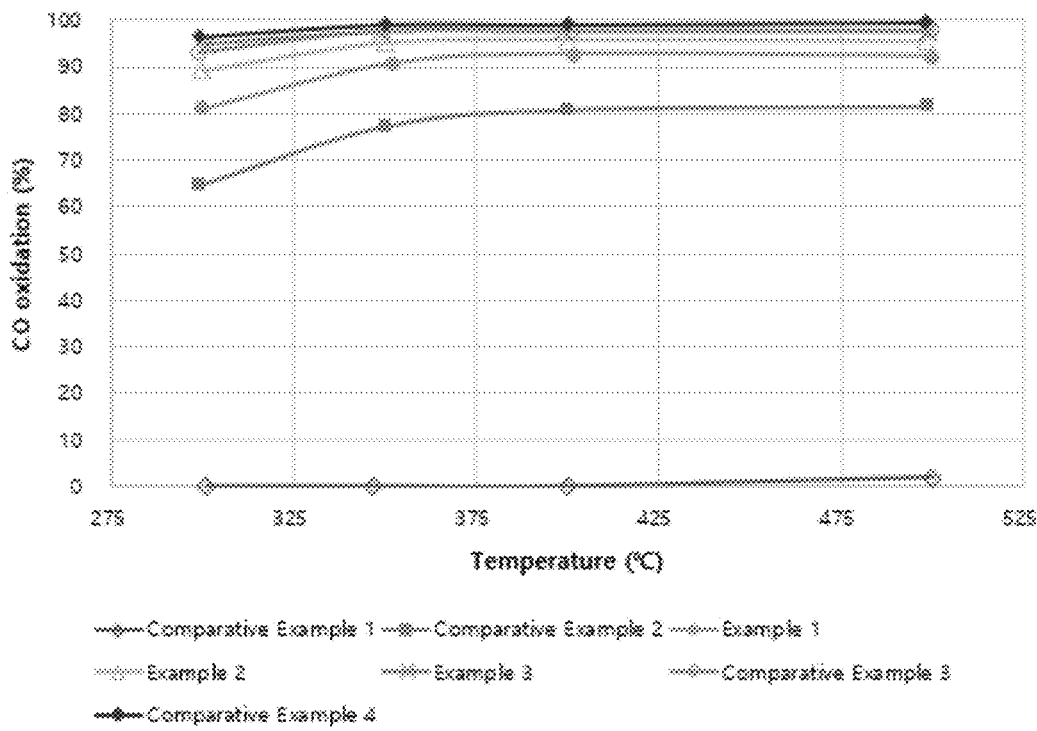
FIG. 3(a), FIG. 3(b) and FIG. 3(c) are the oxidation rate of carbon monoxide, the conversion of ammonia, and the rate of De-NOx according to an embodiment and a comparative example of the present disclosure for each reaction temperature.
Figure 4A:
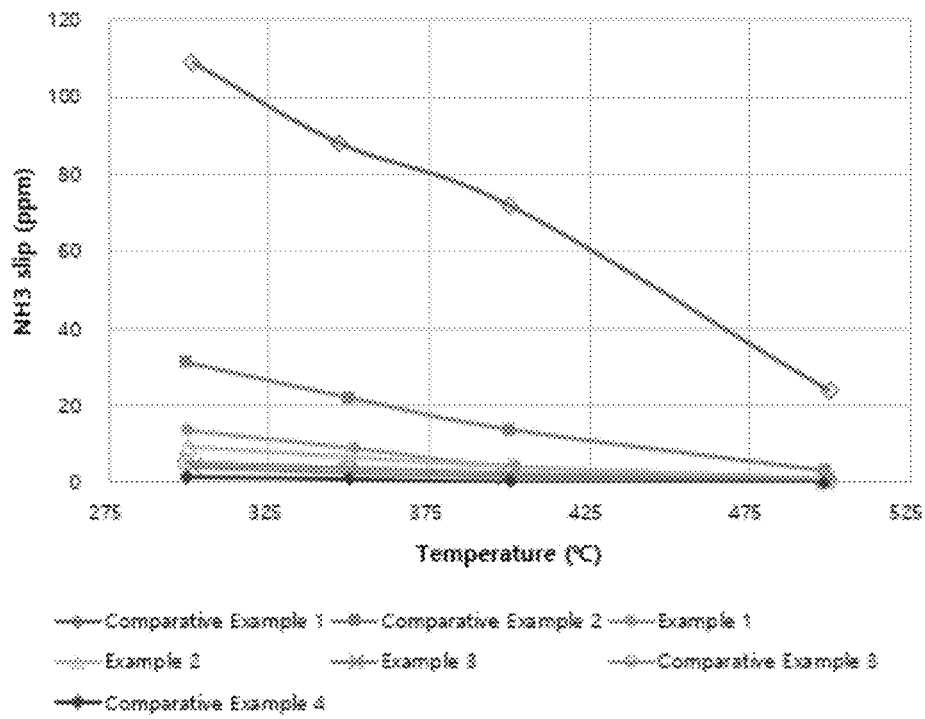
FIG. 4 (a) and FIG. 4(b) the concentration of ammonia, and the concentration of ammonia according to an embodiment and a comparative example of the present disclosure for each reaction temperature.

FIG. 3 shows the oxidation rate of carbon monoxide, the conversion rate of ammonia, and the De-NOx rate at each reaction temperature, and FIG. 4 shows the concentrations of ammonia and NO at each reaction temperature. The oxidation rate of carbon monoxide, the conversion rate of ammonia, and the De-NOx rate were each calculated as follows.

$$\text{Oxidation rate of CO} = \frac{[CO]_i - [CO]_o}{[CO]_i} * 100$$

$$\text{Conversion rate of NH}_3 = \frac{[NH_3]_i - [NH_3]_o}{[NH_3]_i} * 100$$

$$\text{rate of De-NOx} = \frac{[NO]_i - [NO]_o}{[NO]_i} * 100$$

Here, i denotes the reactor inlet side, o denotes the reactor outlet side, and [ ] denotes the concentration of each component.

FIG. 3A shows the oxidation rate of carbon monoxide, and in Comparative Example 1 in which an oxidation catalyst is not present, oxidation is hardly performed, and in Comparative Example 2 in which an oxidation region is short, the oxidation rate of carbon monoxide is 81% or less. From this, it may be seen that when the ratio of the length of the denitrification reaction region to the length of the oxidation reaction region is 11 or more, the oxidation rate of carbon monoxide is decreased.

Figure 3B:
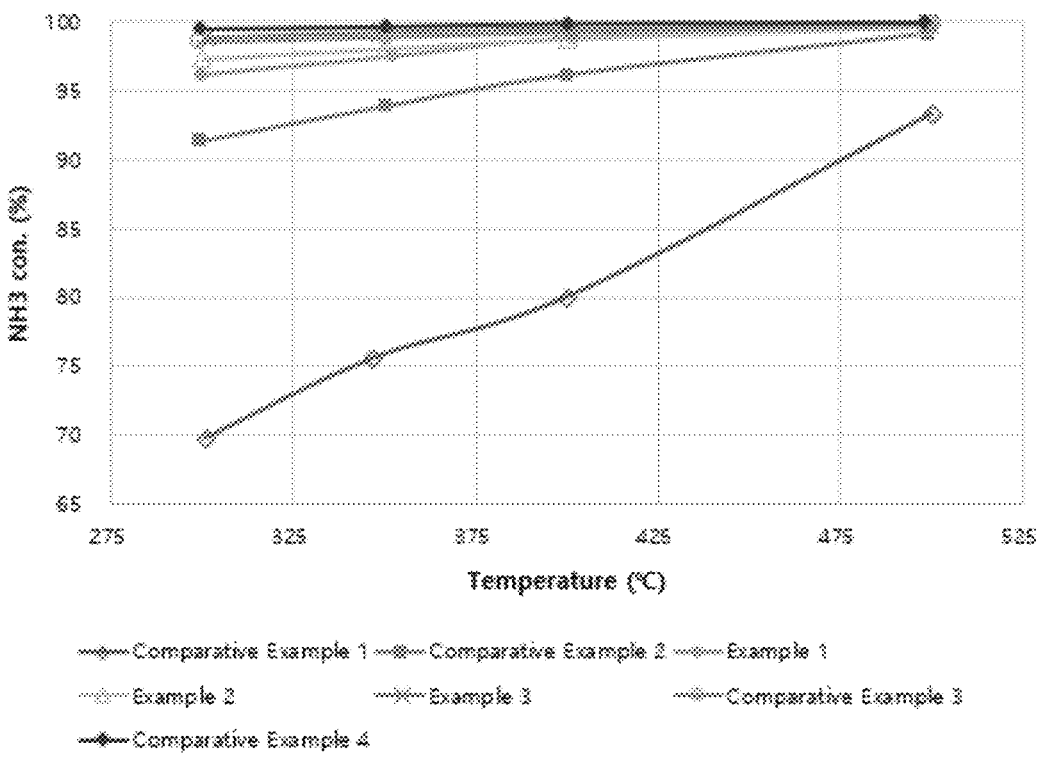

FIG. 3B shows the conversion rate of ammonia. Since ammonia is consumed for the reduction of nitrogen oxide in the denitrification region and is converted to nitrogen in the oxidation region, the conversion rate of ammonia is relatively low in Comparative Example 1 without an oxidation region, and the conversion rate of ammonia is relatively high in the Examples with oxidation region. However, when the ratio of the length of the denitrification reaction region to the length of the oxidation region in the low-temperature region is 11 or more, the conversion rate is relatively low. This can also be seen from the ammonia slip concentration of FIG. 4A.

Figure 3C:
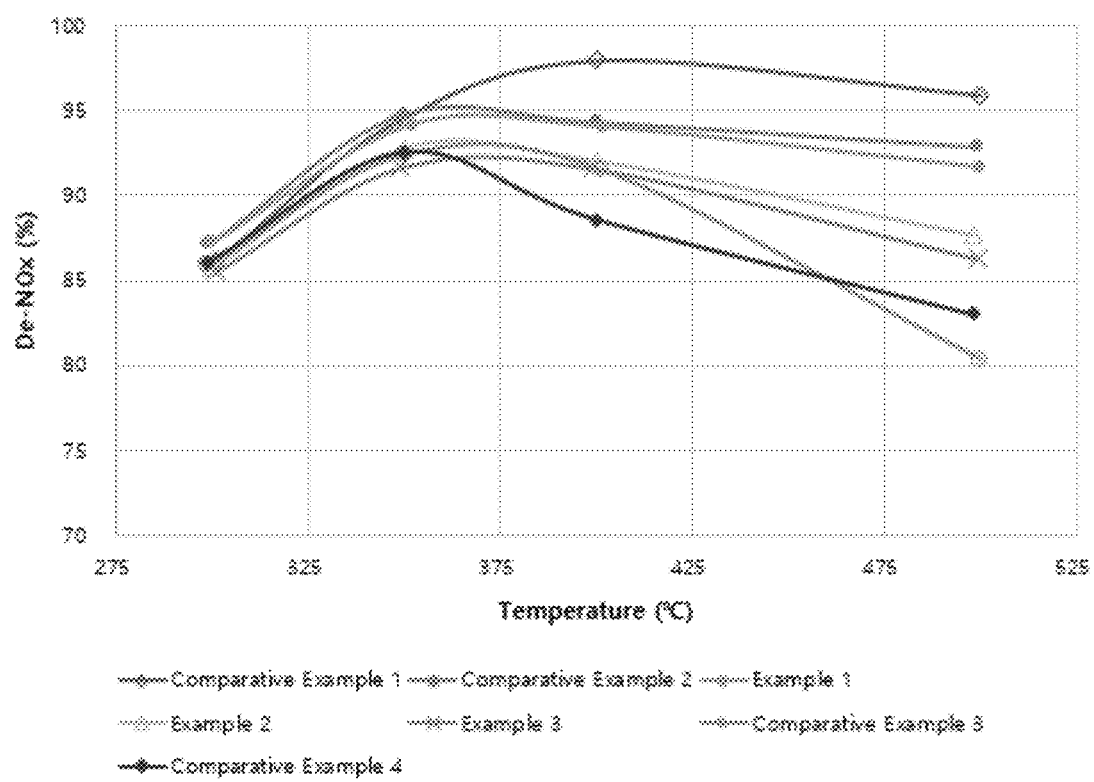
Figure 4B:
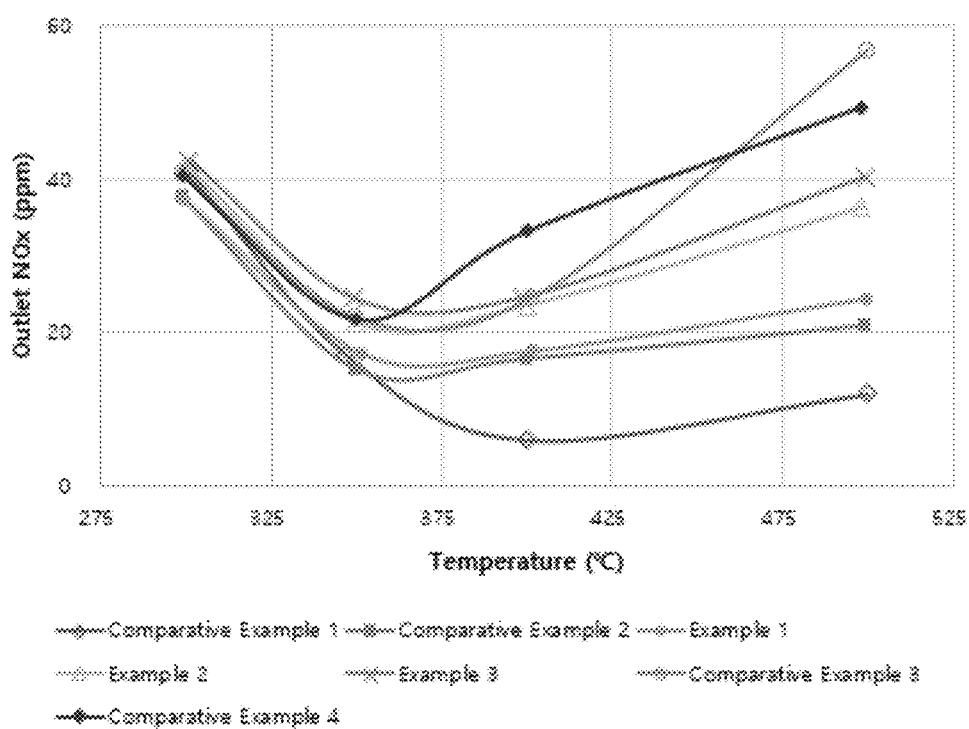

FIG. 3C shows the De-$NO_x$ conversion (%) at each reaction temperature. Comparative Example 1, in which only the denitrification catalyst exists, shows excellent performance over the entire temperature range. Examples 1 to 3, in which the ratio of the length of the denitrification reaction region to the length of the oxidation reaction region is 5.00, 3.00, and 2.43, respectively, also show excellent performance in a whole temperature range. On the other hand, Comparative Examples 3 and 4, in which the ratio of the length of the denitrification reaction region to the length of the oxidation reaction region is 2.00 and 1.40, respectively, show a result that the De-NOx rate starts to be lowered from 350° C., and thus is less than 85% at high temperature. This is because, in the presence of the oxidation catalyst, the conversion rate of carbon monoxide may be increased and ammonia slip may be prevented, but when the oxidation catalyst is excessively present, $NO_x$ is not sufficiently reduced due to insufficient denitrification catalyst and $NH_3$ is converted into nitrogen oxide. In FIG. 4B, which shows the concentration of nitrogen oxides (NOx) on the outlet side, the $NO_x$ concentrations of Comparative Example 3 and Comparative Example 4 are increased from 400° C. and discharged to 50 ppm or more at 500° C.

All simple modifications or changes to the present disclosure can be easily carried out by those skilled in the art, and all such modifications or changes can be considered to be included in the scope of the present disclosure.

What is claimed is:

1. A denitrification-oxidation complex catalyst structure comprising:
   a monolith-type catalyst structure comprising a plurality of cells,
   wherein,
   each of the cells is a mixture of a selective catalytic reduction catalyst, a binder, and a support,
   each of the cells comprises a coated surface region and an uncoated surface region, the coated surface region is coated by an oxidation catalyst in a predetermined length toward an inlet of the monolith-type catalyst structure from an outlet of the monolith-type catalyst structure, a ratio of the length of the uncoated surface region to the predetermined length is greater than 2 and less than or equal to 7, and the monolith-type catalyst structure removes nitrogen oxides, carbon monoxide, hydrocarbons, and ammonia at the same time.

2. The denitrification-oxidation complex catalyst structure of claim 1, wherein the selective reduction catalyst comprises 0.5 to 7% by weight of vanadium and 2 to 8% by weight of tungsten with respect to a total weight of the monolith-type catalyst structure.

3. The denitrification-oxidation complex catalyst structure of claim 1, wherein the oxidation catalyst comprises 0.1 to 3% by weight of platinum, 1 to 4% by weight of vanadium, and 0 to 4% by weight of tungsten with respect to a total weight of the catalyst structure.

4. The denitrification-oxidation complex catalyst structure of claim 1, wherein the oxidation catalyst coated on each of the cells has a thickness of 10 to 200 μm.

5. The denitrification-oxidation complex catalyst structure of claim 1, wherein the support comprises 50% to 90% by weight of $TiO_2$.

6. The denitrification-oxidation complex catalyst structure of claim 1, wherein the binder is one of an organic binder, an inorganic binder, and a mixture of thereof, wherein the inorganic binder is at least one of alumina, glass, water glass, and glass fiber.

7. A method of manufacturing a denitrification-oxidation complex catalyst structure, the method comprising:
(a) preparing a raw material composition comprising a selective catalytic reduction catalyst, a support, and a binder;
(b) mixing the selective catalytic reduction catalyst, the support, and the binder by using a kneader mixer to form a mixture, wherein the binder is one of an organic binder, an inorganic binder, and a mixture of thereof;
(c) forming a catalyst structure including a plurality of cells by processing the mixture into a monolith form and drying and calcinating the monolith form; and
(de) coating a coated surface region of each of the cells with an oxidation catalyst in a predetermined length in an inlet direction from an outlet of the catalyst structure to form the denitrification-oxidation complex catalyst structure, wherein a ratio of the length of a region uncoated with the oxidation catalyst to the predetermined length is greater than 2 and less than or equal to 7.

8. The method of claim 7, wherein the selective reduction catalyst comprises 0.5% to 7% by weight of vanadium and 2% to 8% by weight of tungsten with respect to a total weight of the denitrification-oxidation complex catalyst structure.

9. The method of claim 7, wherein the oxidation catalyst comprises 0.1% to 3% by weight of platinum, 1% to 4% by weight of vanadium, and 0% to 4% by weight of tungsten with respect to a total weight of the denitrification-oxidation complex catalyst structure.

10. The method of claim 7, wherein the coating of the oxidation catalyst in step (de) comprises:
placing one end of the catalyst structure prepared in step (c) in an oxidation catalyst slurry;
removing the one end of the catalyst structure from the oxidation catalyst slurry after a predetermined period of the placing, blowing off an excess of the slurry attached to the one end of the catalyst structure with compressed air, and performing drying and calcining.

11. The method of claim 10, wherein the calcinating in step (de) is performed at a temperature in a range of 450° C. to 550° C.

12. The method of claim 10, wherein the support comprises 50% to 90% by weight of $TiO_2$.

* * * * *